United States Patent [19]

Ikari et al.

[11] Patent Number: 4,461,547
[45] Date of Patent: Jul. 24, 1984

[54] LENS HOOD WITH AN ECCENTRICALLY DISPOSED LIGHT INTERCEPTING BODY FOR A CAMERA

[75] Inventors: Kazuo Ikari, Hachioji; Toru Fujii, Hino, both of Japan

[73] Assignee: Olympus Optical Company, Ltd., Japan

[21] Appl. No.: 507,141

[22] Filed: Jun. 23, 1983

Related U.S. Application Data

[62] Division of Ser. No. 331,585, Dec. 17, 1981.

[30] Foreign Application Priority Data

Mar. 13, 1981 [JP] Japan .................................. 56-35110
Mar. 13, 1981 [JP] Japan .................................. 56-35111

[51] Int. Cl.³ .............................................. G03B 11/04
[52] U.S. Cl. ......................................................... 350/580
[58] Field of Search ............... 350/580, 581, 319, 429, 350/430, 247, 301, 302; 354/287, 150, 190

[56] References Cited

U.S. PATENT DOCUMENTS

| | | | |
|---|---|---|---|
| 1,983,108 | 12/1934 | Verdich | 350/301 |
| 2,437,159 | 3/1948 | Herbert | 350/580 |
| 2,472,307 | 6/1949 | Nagel | 350/580 |
| 3,702,256 | 11/1972 | Stevens | 106/18 |
| 3,740,121 | 6/1973 | Everett | 350/247 |
| 3,915,880 | 10/1975 | Sepulveda | 252/102 |
| 4,115,130 | 9/1978 | Crump et al. | 106/18 |
| 4,154,818 | 5/1979 | Kanada et al. | 106/15.05 |
| 4,164,477 | 8/1979 | Whitby | 252/106 |
| 4,181,622 | 1/1980 | Gavin | 134/42 |
| 4,323,466 | 4/1982 | Curry et al. | 252/106 |

FOREIGN PATENT DOCUMENTS

| | | | |
|---|---|---|---|
| 2327567 | 11/1974 | Fed. Rep. of Germany | 350/247 |
| 53-27541 | 7/1978 | Japan . | |
| 16483 | of 1915 | United Kingdom | 350/301 |

OTHER PUBLICATIONS

Rohm & Haas, "Sanitary Chemicals-Hyamine 3500", Sep. 1977, pp. 1 and 5.

Primary Examiner—Jon W. Henry
Attorney, Agent, or Firm—Ostrolenk, Faber, Gerb & Soffen

[57] ABSTRACT

A shiftable lens hood for a camera includes a light-intercepting body which has its front end representing a sectional form taken on a plane inclined to the center axis thereof of which is secured to a lens barrel of the camera, in eccentric relationship with its mounting section, whereby even when a taking lens is shifted effective light rays within a photographing angle of view are not shaded, thus an effective light-intercepting effect being obtainable.

4 Claims, 5 Drawing Figures

LENS HOOD WITH AN ECCENTRICALLY DISPOSED LIGHT INTERCEPTING BODY FOR A CAMERA

Related Applications

This is a divisional of U.S. patent application Ser. No. 331,585, filed Dec. 17, 1981.

BACKGROUND OF THE INVENTION

The invention relates to a shiftable lens hood for a camera, and more particularly, to a hood for a shiftable taking lens in which effective light rays within the maximum photographing angle of view of the shiftable or perspective control taking lens are not shaded even when the latter is shifted.

As is well known, a lens hood in common use, which is made in a cylindrical form or a prismatic form, is removably mounted on the front end of a taking lens barrel so that effective light rays within the maximum angle of view of a taking lens are not shaded but light rays outside of the maximum angle of view are intercepted. That is, the lens hood in common use is formed so as to exhibit an effective light shading effect only to a specific angle of view adapted to a taking lens barrel on which the lens hood is mounted. Therefore, when such a lens hood is mounted on a shiftable lens whose maximum angle of view varies in accordance with a shifted position of the lens, effective light rays within the angle of view are shaded or, conversely speaking, undesirable light rays are not intercepted, resulting in a failure of the function of the lens hood. To be more precise, (1) a lens hood which is effective to shade light rays outside an angle of view for photographing when the taking lens is not shifted, may cause a shading of effective light rays when the taking lens is shifted to increase the maximum angle of image falling within the increased angle of view, resulting in a vignetting on the periphery of a picture plane; and (2) a lens hood which is effective to shade light rays falling within an angle of view for photographing when the taking lens is shifted may fail to intercept undesirable light rays when the taking lens is shifted in a reduced manner to decrease the maximum angle of view, resulting in a detrimental influence such as a flare, a ghost, or the like in a picture plane.

SUMMARY OF THE INVENTION

It is an object of the invention, in view of the foregoing, to provide a shiftable lens hood for a camera in which effective light rays are not shaded even when a taking lens is shifted and undesirable light rays are effectively intercepted even when the taking lens is shifted in a reduced manner.

According to the invention, since a light intercepting body is provided in eccentric relationship to a mounting section of a lens barrel or is formed so that its front end assumes a sectional form taken on a plane inclined to its center axis, effective light rays within the angle of view for photographing are not shaded and undesirable light rays can be effectively intercepted even when the taking lens is shifted.

DESCRIPTION OF THE PREFERRED EMBODIMENT

Figure 1:
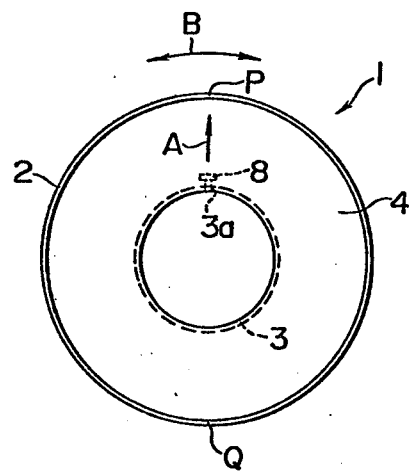
FIG. 1 is an elevational view of a shiftable lens hood for a camera illustrating an embodiment of the invention.
Figure 2:
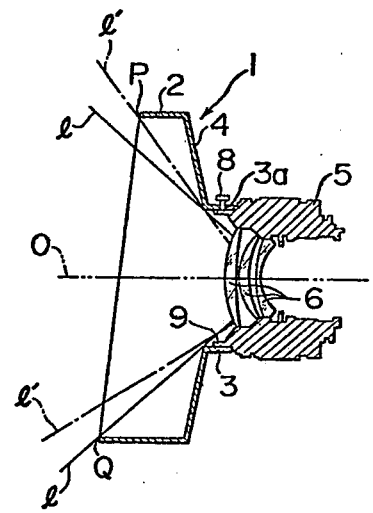
FIG. 2 is a sectional view of the lens hood shown in FIG. 1 which is mounted on a lens barrel.
Figure 3:
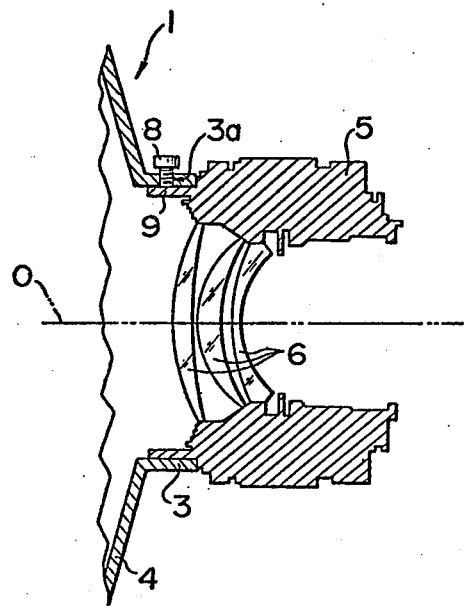
FIG. 3 is a partially enlarged sectional view of a mounting section of the lens hood shown in FIG. 2.

Referring to FIG. 1, there is shown a shiftable lens hood for a camera according to one embodiment of the invention. The lens hood 1, as shown in FIG. 2, comprises a mounting section 3 in the form of a short thin-walled cylinder which has its inner diameter substantially equal to the outside diameter of a front cylinder end 9 of a lens barrel 5 which mounts a shiftable taking lens 6, a light-intercepting body 2 in the form of a thin-walled cylinder which has its inner diameter larger than the outside diameter of the lens barrel 5 and is disposed in coaxial relationship therewith, and a connecting wall 4 in a conical form which connects the light-intercepting body 2 and the mounting section 3. The front end of the light-intercepting body 2 assumes a sectional form taken on a plane inclined to the center axis of the hood 1. The center axis of the hood 1 is disposed so that it substantially coincides with the principal optical axis O of taking lens 6 which is mounted in the lens barrel 5 in a shiftable manner and is in the non-shifted condition when the hood 1 is mounted on the lens barrel 5. The mounting section 3 has a threaded hole 3a pointing to the center axis, as shown in FIG. 3, and a set screw 8 is screwed externally into the hole 3a. The set screw 8 fixes the hood 1 securely to the lens barrel 5 after fitting the mounting section 3 to the front cylinder end 9 of the lens barrel 5.

In operation, assuming that the position of the front end of the light-intercepting body 2 which protrudes most forwardly is a point Q and the position thereof which retreats most is a point P, the hood 1 is secured to the lens barrel 5 with the screw 8 after mounting thereon so that the point P may be positioned in the direction A (see FIG. 1) for shifting the taking lens 6. In such a situation, the portion adjacent to the point Q exhibits the light-intercepting effect in the neighborhood outside of the maximum angle of view which is to be obtained when the taking lens 6 is not shifted and the portion adjacent to the point P exhibits the light-intercepting effect in the neighborhood outside of the maximum angle of view which is to be obtained when the taking lens 6 is shifted, respectively. Accordingly, light rays having the maximum angle of view when the lens 6 is not shifted are not intercepted by the light-intercepting body 2 as shown with a solid line 1 in FIG. 2. Also, a light ray having the maximum angle of view even when the lens 6 is shifted in the shifting direction A is displaced as shown with a dot-dash-line 1' in FIG. 2 but is not intercepted by the light-intercepting body 2. It will be noted that whether the lens 6 is shifted or not, effective light rays necessary to photographing are not intercepted or shaded and undesirable light rays can be intercepted effectively. Additionally, whenever it is desired to change a direction for shifting the lens 6, it may be effected by loosening the screw 8, turning the hood 1 in the direction shown with an arrow B in FIG. 1 so as to locate the light-intercepting body 2 or the point Q on the opposite side of the shifted lens position, and finally retightening the screw 8 to fix the hood 1 to the lens barrel 5. Thus, undesirable light rays can always be intercepted in the best condition.

Figure 4:
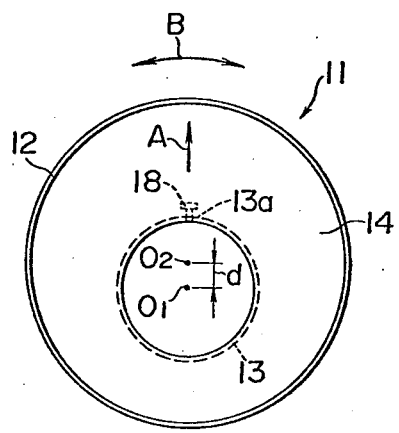
FIG. 4 is an elevational view of a shiftable lens hood for a camera illustrating an embodiment of the invention.
Figure 5:
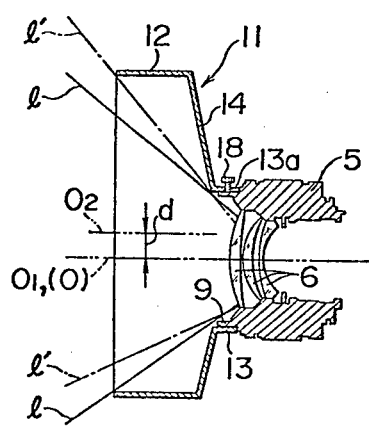
FIG. 5 is a sectional view of the lens hood shown in FIG. 4 which is mounted on a lens hood.

Referring to FIG. 4, there is shown another embodiment of the invention. A shiftable lens hood 11, as shown in FIG. 5, comprises a mounting section 13 in the form of a short thin-walled cylinder which has its inner diameter substantially equal to the outside diameter of a front cylindrical end 9 of a shiftable lens barrel 5, a light-intercepting body 12 in the form of a thin-walled cylinder which has its inner diameter larger than the outside diameter of the lens barrel 5, and a connecting wall 14 in a conical form which connects the light-intercepting body 12 and the mounting section 13 so that their center axes $O_1$ to $O_2$ are disposed eccentrically in spaced relationship with each other by a distance d. When the hood 11 is secured to the lens barrel 5, the center axis $O_1$ of the mounting section 13 substantially coincides with the principal optical axis O with the taking lens 6 not shifted. The mounting section 13 has a threaded hole 13a into which a set screw 18 is fitted, which is quite similar to the hood 1 of the embodiment shown in FIGS. 1 to 3.

The mounting of the hood 11 on the lens barrel 5 is effected by inserting the hood 11 into the lens barrel 5 so that the center axis $O_2$ of the light-intercepting body 12 may be positioned in the direction A for shifting the taking lens 6 and subsequently by fixing with the screw 18. When the hood 11 has been secured to the lens barrel 5, the portion most remote from the optical axis O on the light-intercepting body 12 exhibits the light-intercepting effect in the neighborhood outside of the maximum angle of view which is to be obtained when the taking lens 6 is shifted and the portion closest to the optical axis O on the light-intercepting body 12 exhibits the light-intercepting effect in the neighborhood outside of the maximum angle of view which is to be obtained when the taking lens 6 is not shifted. Therefore, a light ray having the maximum angle of view when the lens 6 is not shifted is not intercepted by the light-intercepting body 12 as shown with a solid line l in FIG. 5. Even when the lens 6 is shifted in the direction A for shifting the lens 6 a light ray having the maximum angle of view is displaced as shown with a dot-dash-line l' in FIG. 5 but is not intercepted by the light-intercepting body 12. It is to be noted, therefore, that the same effect as the hood 1 shown in FIGS. 1 to 3 can be expected. When it is desired to change a direction for shifting the lens 6, it may be effected by loosening the screw 18, turning the hood 11 in the direction shown with an arrow B so that the center axis $O_2$ of the light-intercepting body 12 may be in the shifting direction A, and finally retightening the screw 18 to fix the hood 11 to the lens barrel 5. As a result, undesirable light rays can always be intercepted in the best condition.

In the above-mentioned embodiments, in which each hood is secured to the lens barrel with the set screw, it will be understood that the hood may be combined with the lens barrel by means of threads by providing female thread on the inside of the front cylinder end of the lens barrel and by providing male thread on the outside of a mounting section of the hood which is formed so as to have the outside diameter substantially equal to the inner diameter of the lens barrel.

Although the light-intercepting body is integrally formed with the mounting section through the connecting wall, it may be disposed so as to be rotatable with respect to the mounting section. Thus, the proper positioning of the light-intercepting body in the direction for shifting the taking lens can be simply effected without loosening the set screw whenever a shifting direction of the taking lens is changed.

Furthermore, it will be understood that the shape of the light-intercepting body, which is in a cylindrical form in the above description, may be in another form which is currently used such as a rectangular form, petal form, or the like.

What is claimed is:

1. The combination, comprising:
    (A) a camera having a picture taking lens, said lens having an optical axis, said lens being shiftable in a direction perpendicular to said optical axis; and
    (B) a lens hood including:
        (1) a mounting section adapted to be mounted on a lens barrel of said picture taking lens; and
        (2) a light-intercepting body having a central axis and being coupled with said mounting section in an eccentric relationship therewith, said lens hood being coupled to said picture taking lens in such an orientation that said optical axis and said central axis are parallel to each other but spaced apart from each other by a distance less than the radius of said picture taking lens as measured along a direction to said optical axis.

2. The combination of claim 1, wherein said body is cylindrical.

3. The combination of claim 2 wherein said mounting section is cylindrical.

4. The combination of claim 1, wherein said mounting section is provided with a set screw for screwing said lens hood to said lens barrel.

* * * * *